(12) United States Patent
Hoyt et al.

(10) Patent No.: US 7,933,554 B2
(45) Date of Patent: Apr. 26, 2011

(54) SYSTEMS AND METHODS FOR SHORT RANGE WIRELESS COMMUNICATION

(75) Inventors: Reed W. Hoyt, Framingham, MA (US); John F. Lanza, Orlando, FL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1303 days.

(21) Appl. No.: 11/022,651

(22) Filed: Dec. 28, 2004

(65) Prior Publication Data

US 2006/0084380 A1 Apr. 20, 2006

Related U.S. Application Data

(60) Provisional application No. 60/624,740, filed on Nov. 4, 2004.

(51) Int. Cl.
*H04B 7/00* (2006.01)
(52) U.S. Cl. ... 455/41.2; 455/41.1; 455/455; 455/556.1; 455/575.5; 455/100; 360/99.07; 360/99.08; 310/90; 310/268; 310/51; 310/254
(58) Field of Classification Search ............... 455/41.2, 455/41.1, 100, 556.1, 575.5; 380/99.08; 310/90, 268, 51; 360/98.07
See application file for complete search history.

(56) References Cited

U.S. PATENT DOCUMENTS

| | | | |
|---|---|---|---|
| 5,305,244 A * | 4/1994 | Newman et al. | 708/141 |
| 5,416,310 A * | 5/1995 | Little | 235/462.44 |
| 5,437,057 A | 7/1995 | Richley | |
| 5,759,044 A * | 6/1998 | Redmond | 434/307 R |
| 5,771,438 A * | 6/1998 | Palermo et al. | 455/41.1 |
| 5,774,338 A * | 6/1998 | Wessling, III | 361/730 |
| 5,798,907 A * | 8/1998 | Janik | 361/683 |
| 5,844,824 A * | 12/1998 | Newman et al. | 345/156 |
| 5,873,070 A * | 2/1999 | Bunte et al. | 705/28 |
| 5,912,925 A * | 6/1999 | Palermo et al. | 375/258 |
| 5,982,764 A * | 11/1999 | Palermo et al. | 370/345 |
| 6,115,636 A * | 9/2000 | Ryan | 607/60 |
| 6,191,517 B1 | 2/2001 | Radovsky | |
| 6,208,740 B1 * | 3/2001 | Grever | 381/79 |
| 6,208,867 B1 * | 3/2001 | Kobayashi | 455/462 |
| 6,233,336 B1 * | 5/2001 | Croft et al. | 379/443 |
| 6,331,972 B1 | 12/2001 | Harris et al. | |
| 6,349,116 B1 * | 2/2002 | Hash et al. | 375/258 |
| 6,424,820 B1 * | 7/2002 | Burdick et al. | 455/41.1 |
| 6,459,882 B1 * | 10/2002 | Palermo et al. | 455/41.1 |

(Continued)

OTHER PUBLICATIONS

Bourzac, Katherine, "Weaable Health Reports", Impact of Emerging Technologies, Technology Review, Feb. 28, 2006, printed Mar. 1, 2006, www.technolgyreview.com/BizTech/wtr_16431.295.p1. html.

(Continued)

*Primary Examiner* — Marceau Milord
(74) *Attorney, Agent, or Firm* — Elizabeth Arwine (57) ABSTRACT

A magnetic induction data transmission network comprising a master hub, at least one sensor node communicatively coupled to the master hub and a magnetic induction coil preferably adapted to be worn about a bodypart of a subject such as an individual's waist or neck. In at least one embodiment of the invention, the magnetic induction coil preferably includes a connector which serves as an intermediary between the coil and the hub to allow data communication.

18 Claims, 7 Drawing Sheets

U.S. PATENT DOCUMENTS

| | | | |
|---|---|---|---|
| 6,507,486 B2 | 1/2003 | Peterson, III | |
| 6,527,711 B1 | 3/2003 | Stivoric et al. | |
| 6,560,468 B1 * | 5/2003 | Boesen | 455/569.1 |
| 6,694,180 B1 | 2/2004 | Boesen | |
| 6,754,472 B1 * | 6/2004 | Williams et al. | 455/100 |
| 6,799,035 B1 * | 9/2004 | Cousins | 455/418 |
| 6,823,195 B1 * | 11/2004 | Boesen | 455/522 |
| 6,859,831 B1 * | 2/2005 | Gelvin et al. | 709/224 |
| 6,864,780 B2 * | 3/2005 | Doi et al. | 340/5.64 |
| 7,015,859 B2 * | 3/2006 | Anderson | 342/450 |
| 7,099,621 B1 * | 8/2006 | Chadwick | 455/3.01 |
| 7,158,754 B2 * | 1/2007 | Anderson | 455/41.1 |
| 7,236,742 B2 * | 6/2007 | Hall et al. | 455/41.3 |
| 7,436,789 B2 * | 10/2008 | Caliskan et al. | 370/310.1 |
| 7,447,325 B2 * | 11/2008 | Bren et al. | 381/331 |
| 7,668,122 B2 * | 2/2010 | Sung et al. | 370/280 |
| 2003/0125017 A1 * | 7/2003 | Greene et al. | 455/414 |

OTHER PUBLICATIONS

Aura Communications, Inc., "Near-Field Magnetic Communication Properties", 2003, p. 1-5.

Aura Communications, "LibertyLing™ Summary Datasheet", May 8, 2003, Document 1299, Aura Communictions, p. 1-8.

Bunszel, Chris, Magnetic Induction: A low-power Wireless Alternative, RF Design, Nov. 1, 2001, downloaded and printed Jan. 27, 2004, http://rfdesign.com/ar/radio_magnetic_induction_lowpower/.

Electronic Design, "Magnetic Induction to Spur the Growth of Personal-Area Networks", Nov. 19, 2001, downloaded and printed Jan. 27, 2004, http://www.elecdesign.com/Articles/ArticleID/3514/3514.html.

Eng, Paul, "Short-Range Communiction Chip Uses Magnetic Waves", downloaded and printed Jan. 27, 2004, http://www.fonegear.com/press_5.thm.

Gupta, Puneet, "Personal Area Networks: Say it and You ae Connected!", downloaded and printed Oct. 23, 2005, http://www.worelessdevnet.com/channels/blue/tooth/features/pans.html.

Phonak Communictions AG, "Covert Wireless Equipment", downloaded and printed Oct. 24, 2005, www.phonarkcom.ch/english/tamfunk/tamfunk.asp.

Phonak Communictions AG, "Phonito Digital Technical Specifications", downloaded and printed Oct. 24, 2005, www.phoitodigital.com.

Welsh, Matt et al., Vital Dust: Wireless Sensor Networks for Emergency Medical Care, downloaded and printed Feb. 18, 2004, http://www.eecs.harvard.edu/~mdw/proj/vitaldust/.

XEMICS SA, "XE1209 30-70kHz Ultra Low Powr CMOS Transceiver", 2002, p. 1-9.

XEMICS SA, "XE1200 series" Ultra low power transceivers from 30 kHz to 915MHz, 2003, p. 1-4.

XEMICS, "XE 1209 > Ultra low power CMOS transceiver for operation in the 30-70kHz band" downloaded and printed Jul. 29, 2004, www.xemics.com/internet/products/products.jsp?.

* cited by examiner

SYSTEMS AND METHODS FOR SHORT RANGE WIRELESS COMMUNICATION

I. FIELD OF THE INVENTION

The present invention relates generally to short range wireless communication and, more specifically, to systems employing magnetic induction data communication networks for short range wireless communication.

II. BACKGROUND OF THE INVENTION

For years, Radio Frequency (RF) systems have been employed to transfer data between communication devices. For example, an RF transmitter may be employed to transmit data to an RF receiver. The growth of RF technology over the years has resulted in an increased use of the services for which the technology may be employed. For example, wireless services for electronic communication devices such as cellular telephones, pagers, personal digital assistants (PDAs), and RF Local Area Networks (LANs) have utilized RF technology to provide data communication. Although the growth of RF technology has resulted in significant benefits in the form of increased services in which the technology can be utilized, it has also resulted in a number of significant problems.

For example, as the growth of the above referenced services continues to increase, RF technology will become less viable, as the technology has a limited frequency spectrum which will eventually be depleted. In addition, RF technology is "far-field" and thus susceptible to eavesdropping and other security issues. Fading, antenna orientation problems, unpredictable maximum range, and higher power requirements are also problems experienced using RF technology.

As an alternative to employing RF technology to transmit and receive data amongst devices, magnetic induction technology may be utilized to transmit and receive the data. Unlike RF technology, magnetic induction technology transmits and receives data by encoding electronic signals into magnetic waves. As magnetic waves typically operate on a much lower frequency than the radio waves utilized in RF-based communication devices such as mobile telephones and ordinary cordless telephones, for example, a minimum amount of interference from other devices is experienced. Operation at a lower frequency also consumes less power than RF technology.

Unfortunately, however, magnetic induction has a significant drawback, that of a limited range of data transmission and reception. For example, the transmission and reception range of systems and networks utilizing magnetic induction is typically no greater than approximately one meter. In addition, in many magnetic induction networks, if the transmitter and receiver antennae are not properly aligned, data transmission can be significantly degraded. As a result of this inability to transmit and receive data over greater distances and the meticulous alignment requirements, conventional magnetic induction data transmission networks are not as effective as they could be.

Therefore, what is needed is a magnetic induction data transmission network including a greater maximum range of data transmission and reception. Such a network should provide more effective and reliable transmission and reception of data between communication devices in the network regardless of the relative position of the communication devices.

III. SUMMARY OF THE INVENTION

It is an object of the present invention to overcome problems of the prior art.

An objective of the present invention is to provide a magnetic induction coil adapted to fit an individual's body to produce a powerful magnetic flux field for more effective and reliable data communication over a greater maximum distance range.

An objective of the present invention is to accommodate for misalignment angles between communication devices in a magnetic induction data transmission network.

An advantage of at least one embodiment of the present invention is the magnetic induction coil may be conveniently opened and closed for ease of donning and doffing.

An advantage of at least one embodiment of the present invention is that the magnetic induction coil includes a coil connector having staggered coil connections to produce a continuous spirally wound coil.

An advantage of at least one embodiment of the present invention is that the master hub can be included in a belt buckle of an individual's belt.

An advantage of the present invention is that the magnetic induction coil may accommodate a variety of sizes of individuals.

The present invention relates to a magnetic induction data transmission network comprising a master hub, at least one sensor node communicatively coupled to the master hub to allow the master hub and the at least one sensor node to communicate, and a magnetic induction coil preferably adapted to be worn about a bodypart of an individual such as an individual's waist, shoulder, or neck.

The magnetic induction coil is preferably connected to the master hub to allow data reception and transmission. In at least one embodiment of the invention, the magnetic induction coil preferably includes a connector residing at a transection point of the coil. The connector preferably serves as an intermediary between the coil and the hub.

In at least one embodiment of the present invention, a master hub is preferably included in the magnetic induction data transmission network for transmitting and receiving data. The master hub preferably includes an internal microprocessor adapted to communicate with another microprocessor located outside of the network, and a data storage area communicatively coupled to the internal microprocessor for storing data received by the internal microprocessor.

In at least one embodiment of the invention, a method is provided for communicating using a magnetic induction data transmission network including transmitting or receiving data to or from a master hub to at least one sensor node wherein the master hub is located on a first individual and the at least one sensor node is located on a textile of a second individual.

In at least one embodiment of the invention, a method is provided for communicating using a magnetic induction data transmission network including transmitting or receiving data to or from the master hub to a central hub located in a remote network.

Given the following description of the drawings, the magnetic data transmission network of the present invention should become evident to a person of ordinary skill in the art.

IV. BRIEF DESCRIPTION OF THE DRAWINGS

Like reference numerals in the figures represent and refer to the same element or function throughout.

V. DETAILED DESCRIPTION OF THE INVENTION

Figure 1:
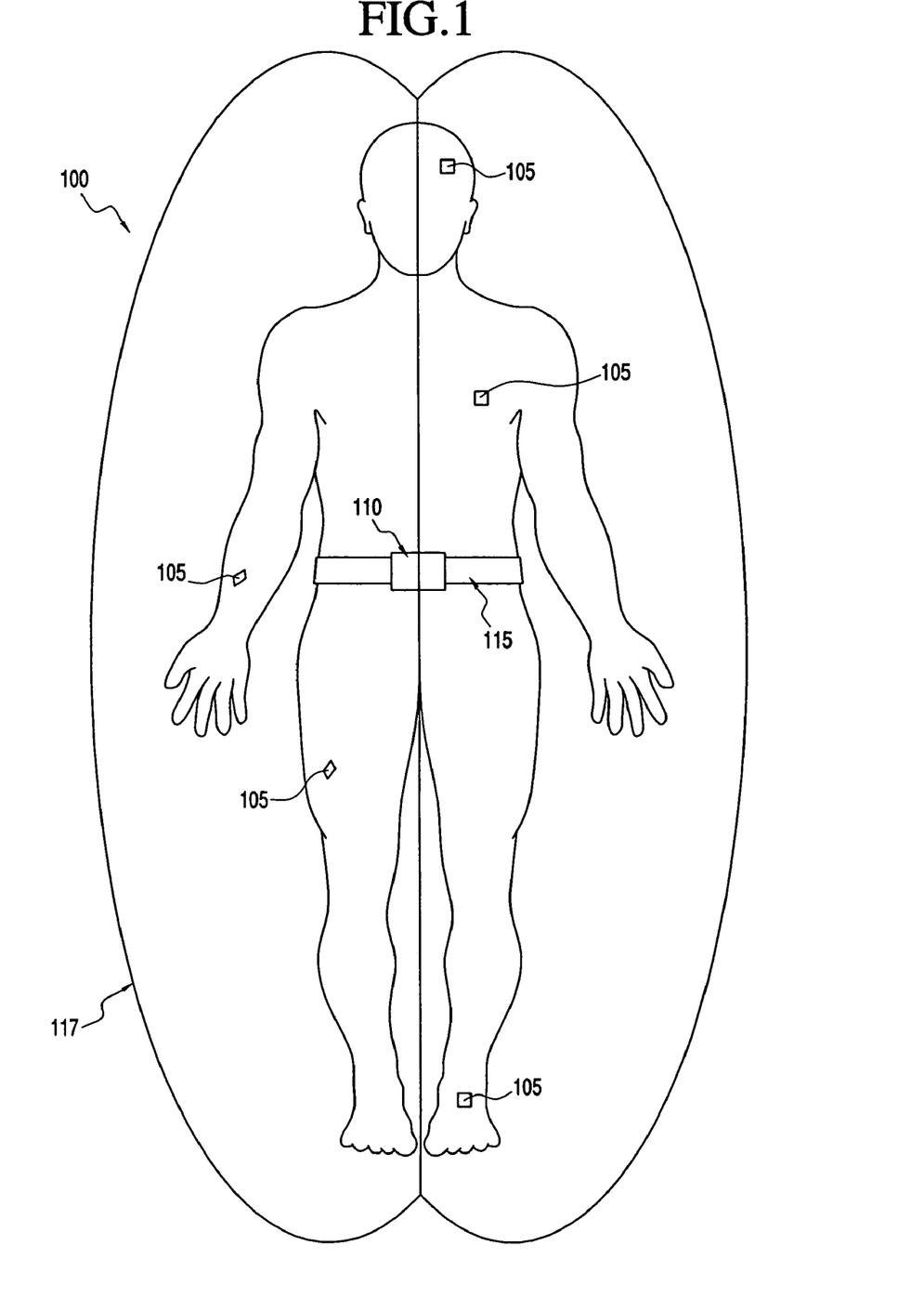
FIG. 1 illustrates an exemplary magnetic induction data transmission network according to at least one embodiment of the present invention.

FIG. 1 illustrates an exemplary magnetic induction data transmission network 100 according to an embodiment of the invention. In at least one embodiment of the invention, the network 100 is a wearable near-field magnetic induction data transmission network that may be worn by an individual.

The network 100 preferably includes at least one and preferably several sensor nodes 105, a master hub 110, and a magnetic induction coil 115. The one or more sensor nodes 105 are preferably communicatively coupled to the master hub 110 to allow the master hub 110 and the sensor nodes 105 to receive and transmit data. In some embodiments, magnetic induction coil 115 may be adapted to be worn about a bodypart of an individual. Magnetic induction coil 115 generates a large magnetic field that envelops the wearer and facilitates reliable data transmission and reception between senor nodes 105 and master hub 110.

After being presented with the disclosure herein, those skilled in the relevant art will realize that master hub 110 may communicate with sensor nodes 105 via a variety of types of communication protocols. For example, a round-robin type of protocol may be utilized. In such a protocol, the master hub 110 preferably queries each sensor node 105 in a specified interval of time. Such a protocol is well known to those skilled in the art and will not be described further herein. Likewise, master hub 110 and sensor node 105 may be arranged in a variety of network topologies, e.g., hub and spoke, mesh, etc.

In keeping with the invention, data communication between the master hub 110 and sensor nodes 105 need not occur bidirectionally. In other words, in some embodiments master hub 110 queries the various sensor nodes 105 responsive to a command or according to a predetermined schedule. In other embodiments, the sensor nodes push data to master hub 110 responsive to a command or according to a predetermined schedule.

The large magnetic field 117 generated by magnetic induction coil 115 facilitates data transmission and reception over network 100 through a distance range of up to about four meters or greater, more preferably through a distance range of 0 to about 3.2 meters. The magnetic field 117 reaches sensor nodes 105 thus allowing data to be carried back and forth between the master hub 110 and sensor nodes 105. As such, magnetic induction coil 115 acts as a booster antenna for network 100. It is believed that such an extended reception range enhances the effectiveness and reliability of data transmission using magnetic induction.

As illustrated in FIG. 1, one or more sensor nodes 105 may be disposed at various locations over an individual's body, for example, at an individual's head, feet, chest, arms, and legs. Sensor nodes 105 preferably sense a variety of parameters. For example, in at least one embodiment of the invention, one or more sensor nodes 105 detect one or more of the following: 1) physiological parameters such as but not limited to blood pressure, heart rate, pulse, body temperature, foot speed and/or impact, walking speed, eye movements, sweat rate, frequency of swallowing, respiratory frequency, voice communications, water consumption and blood oxygenation; and 2) environmental parameters such as but not limited to air temperature, air quality, atmospheric pressure, humidity, solar radiation, wind speed, activity patterns, geolocation.

Figure 2A:
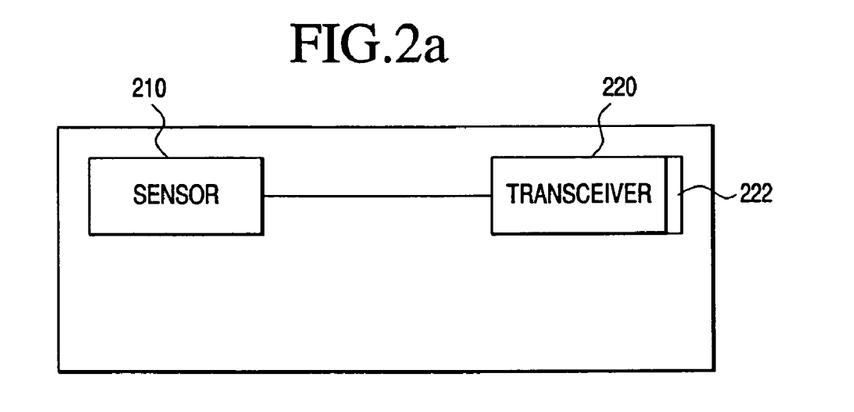
FIGS. 2a-2c illustrate various embodiments of sensor nodes of the present invention.
Figure 2B:
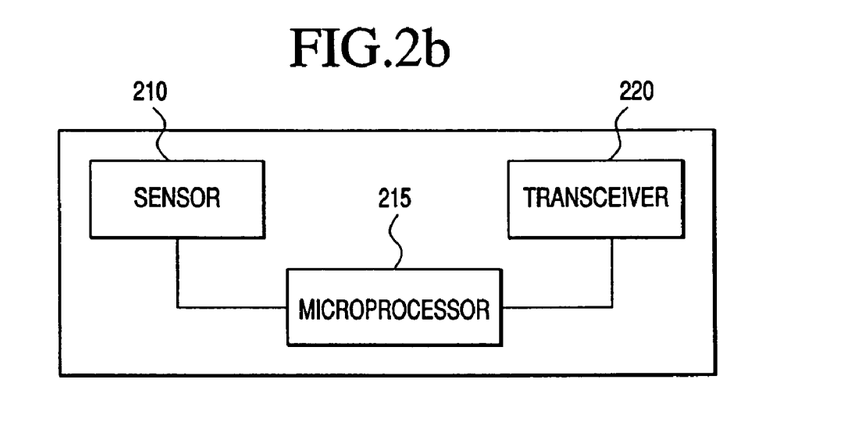

As illustrated in FIGS. 2a and 2b each sensor node 105 includes a sensor 210. In accordance with the embodiment illustrated in FIG. 2a, one or more sensor nodes 105 may also include a magnetic induction transceiver 220 having an antenna 222 disposed either internal or external to magnetic induction transceiver 220. In this embodiment, magnetic induction transceiver 220 transmits data from sensor 210 over a short distance to master hub 110.

In an alternative embodiment as depicted in FIG. 2b, a microprocessor module 215 receives data from sensor 210, processes the data and is communicatively coupled to magnetic induction transceiver 220 such that magnetic induction transceiver 220 transmits data from microprocessor 215 over a short distance to master hub 110.

Figure 2C:
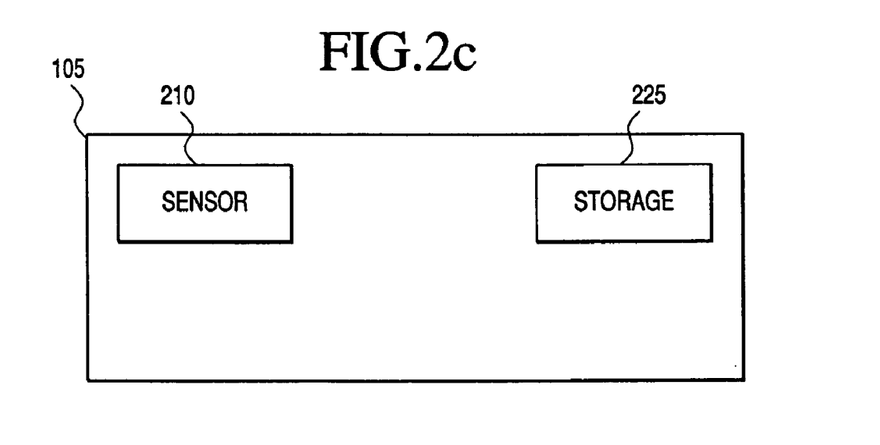

In accordance with still another embodiment shown in FIG. 2c, sensor node 105 includes sensor 210 and storage module 225. In this embodiment, the data sensed by sensor 210 is stored in storage unit 225 for retrieval by master hub 110. Exemplary sensor nodes include 1) heart rate monitors such as the Polar Contact Heart Rate System available from Polar USA of Lake Success, N.Y.; 2) temperature sensors such as the VITALSENSE® monitor available from Mini Mitter Co., Inc. of Bend, Oreg.; and 3) position sensors such as the GPS 15 available from Garmin International, Inc. of Olathe, Kans. and the DRM-III available from Point Research Corporation of Fountain Valley, Calif.

Figure 3:
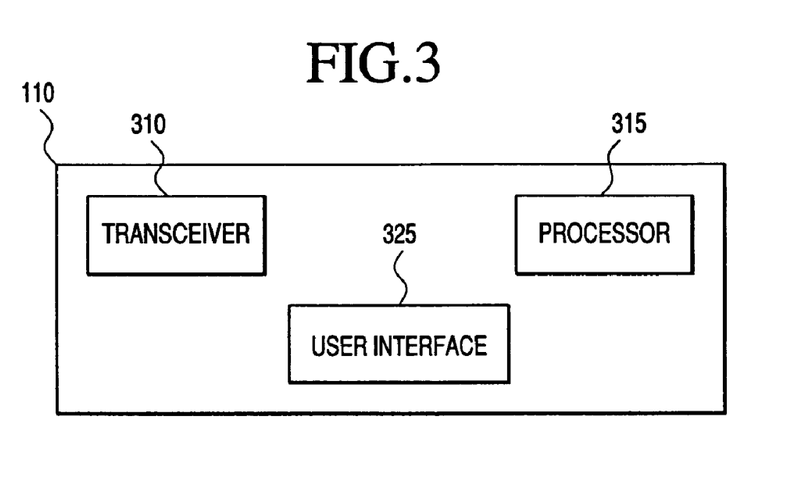
FIG. 3 depicts a block diagram of a master hub of the present invention.

As illustrated in FIG. 3, the master hub 110 preferably includes a transceiver module 310 that transmits and receives data to and from senor nodes 105 and/or other master hubs 110. Master hub 110 also may include a processor module 315 in communication with transceiver module 310 that may be programmed to perform one or more of the following functions: set baud rates, determine whether to transmit or receive data, send data, receive and store data as well as perform other housekeeping functions. In some embodiments, master hub 110 may include or be operatively connected with a user interface 325, i.e., a display, such that data received by master hub 110 from sensor 105 may be stored in memory or processed and displayed on user interface 325. For example, the master hub 110 may transmit a signal to a sensor node 105 responsible for detecting blood pressure to inform the node to conduct measurements for blood pressure. In response to the signal transmitted by master hub 110, sensor node 105 measures blood pressure and transmits a signal indicative of the measured blood pressure back to master hub 110. In some embodiments, the blood pressure readings may be directly displayed on user interface 325. In other embodiments, the blood pressure readings may be stored in memory for later retrieval. In still other embodiments, blood pressure data may be processed by processor 315 to generate new data. This new data may be displayed by user interface 325 or stored in memory for later retrieval.

Figure 4:
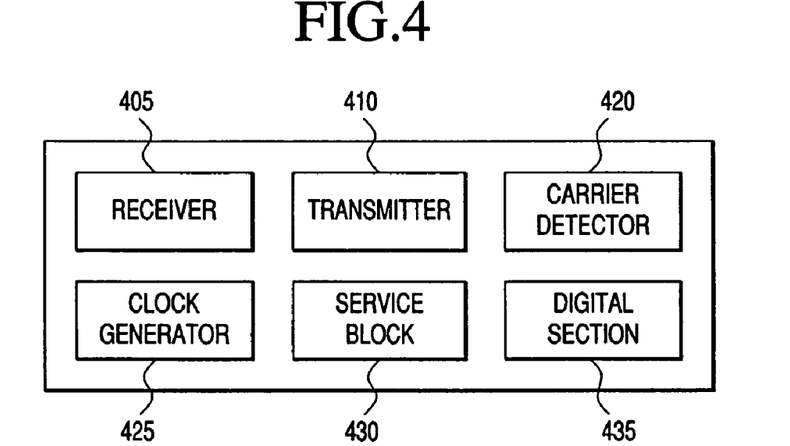
FIG. 4 shows a transceiver in accordance with the present invention.

FIG. 4 illustrates functional components of transceivers 220 and 310. As is readily understood by a person having skill in the art, commercial transceivers may include other functional components not shown or discussed.

Each of Transceivers 220 and 310 include a receiver 405, a transmitter 410, a carrier detector 420, a clock generator 425, a service block 430, and a digital section 435. Those skilled in the art will readily understand the functions of each of these components. Thus, they will only be described briefly herein.

The receiver 405 converts a modulated signal into a bit stream. The receiver 405 may include a variety of other products such as a preamplifier, a demodulator, a plurality of down-converters, a plurality of channel filters, a plurality of limiters, and a bit synchronizer.

The transmitter 410 modulates an input bit-stream. The transmitter 610 may also include a variety of other components such as a synthesizer for generating a digital signal with a modulated period, and a power amplifier for generating a square-wave output current.

The carrier detector 420 detects the presence of a signal at the carrier frequency.

The clock generator 425 may be realized by a quartz oscillator for generating a reference signal and a phase locked loop (PLL) for delivering a signal at a frequency which relates to the oscillator output.

The service block 430 provides the transceiver circuitry with the required voltage references and current sources. The digital section 435 is used to implement the interface for the communication with an external processor, e.g., processors 215 and 315, and generates internal signals according to the selected mode of operation.

Transceiver 220 further includes an internal antenna 440. However, in preferred embodiments, in transceiver 310, the internal antenna 440 is not present. Rather, master hub 110 is operatively connected to magnetic induction coil 115 which functions as a high-powered antenna.

A preferred transceiver is the XE1209 ultra low power CMOS transceiver, manufactured by Xemics Corporation of Neuchatel Switzerland. It should be noted, however, that other transceivers may be utilized in conjunction with the present invention. For instance, the Libertylink® transceiver, manufactured by Aura Communications, Inc., of Wilmington, Mass., U.S.A. may also be utilized in conjunction with the present invention.

In conventional magnetic induction communication networks it is desirable to align the antennae of respective transceivers in parallel to realize reliable data transmission. Misalignment of the antennae may cause significant data transmission degradation.

In keeping with the invention, sensor nodes 105 may be directly attached to a user's skin, however, the sensor nodes 105 are preferably mounted on clothing or equipment worn by the user. The angle of orientation of each sensor node 105 relative to induction coil 115 sometimes varies due to the motion of the user. As a result, sensor nodes 105 may become misaligned with magnetic induction coil 115. The large magnetic field 117 compensates for misalignment of sensor nodes 105 and magnetic coil 115. More particularly, one or more sensor nodes 105 may be misaligned with magnetic induction coil 115 by an angle of up to plus or minus forty-five degrees ($\pm 45°$) without significantly inhibiting data transmission between sensor node 105 and master hub 110. Thus, when the orientation angle of one or more sensor nodes 105 are altered and misalignment between the coil 115 and the one or more sensor nodes 105 occur, the network 100 continues to effectively operate, i.e., the master hub 110 and the at least one sensor node 105 continue to reliably transmit and receive data at a distance of up to about three meters or more.

To facilitate efficient data transmission to and from master hub 110, master hub 110 is preferably located on the body in proximity to the magnetic induction coil 115. For instance, in some embodiments, the master hub 110 is preferably a part of a belt buckle connected to the magnetic induction coil 115, or attached to the side of the individual in at least one embodiment. In an embodiment in which the magnetic induction coil 115 is included in an armband, the master hub 105 is located on or near the arm of the individual. After being presented with the disclosure herein, those skilled in the relevant art will realize that the master hub 110 may be located at a variety of other locations without departing from the spirit and scope of the present invention.

Figure 5:
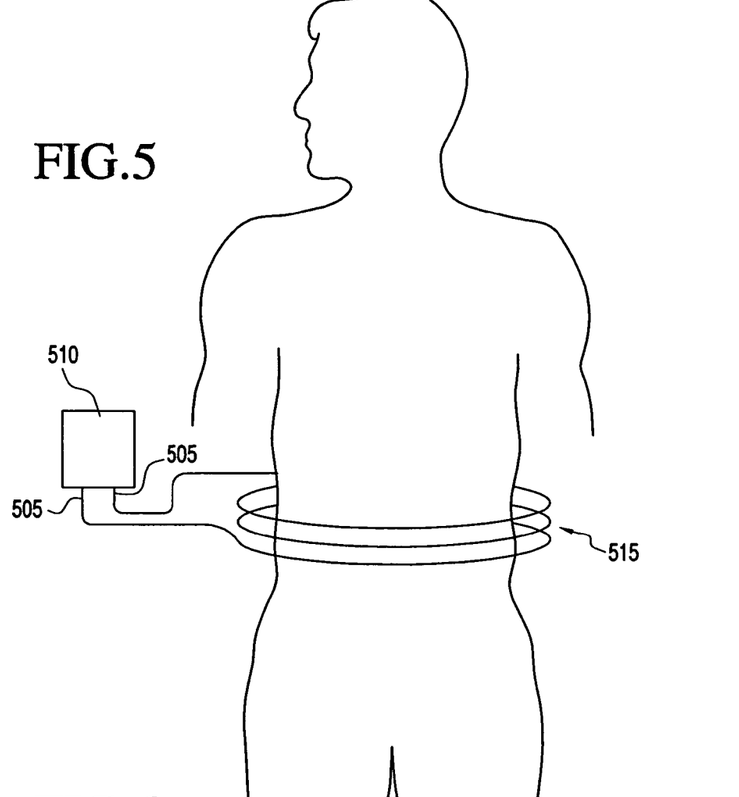
FIG. 5 illustrates an exemplary coil according to an embodiment of the invention.

FIG. 5 depicts an exemplary magnetic induction coil 515 connected to a master hub 510. As previously mentioned, the diameter of the magnetic induction coil 515 is relatively large (for example, approximately eight inches to over fifteen inches). As a result of the size of the diameter of the magnetic induction coil 515, the range of data transmission and reception in network 100 is increased from conventional magnetic induction networks, thereby producing a more effective data transmission network.

In at least one embodiment of the invention, the magnetic induction coil 515 preferably conducts a current in the milliampre range. In an exemplary embodiment, magnetic induction coil 515 may conduct a current of about 10 milliamps. It should be noted that the number of turns of the magnetic induction coil 515 is preferably a function of the desired inductance of the magnetic induction coil 515.

In one embodiment, magnetic induction coil 515 may be comprised of a spirally wound wire having a plurality of turns where each turn is parallel to and adjacent to its immediate predecessor turn. Alternatively, magnetic induction coil 515 may comprise a continuous loop of a single layer of a number of turns of wire in which each turn is laid parallel and adjacent to the previous turn. The single layer may be multi-conductor flat ribbon cable or Mylar® cable.

Figure 6:
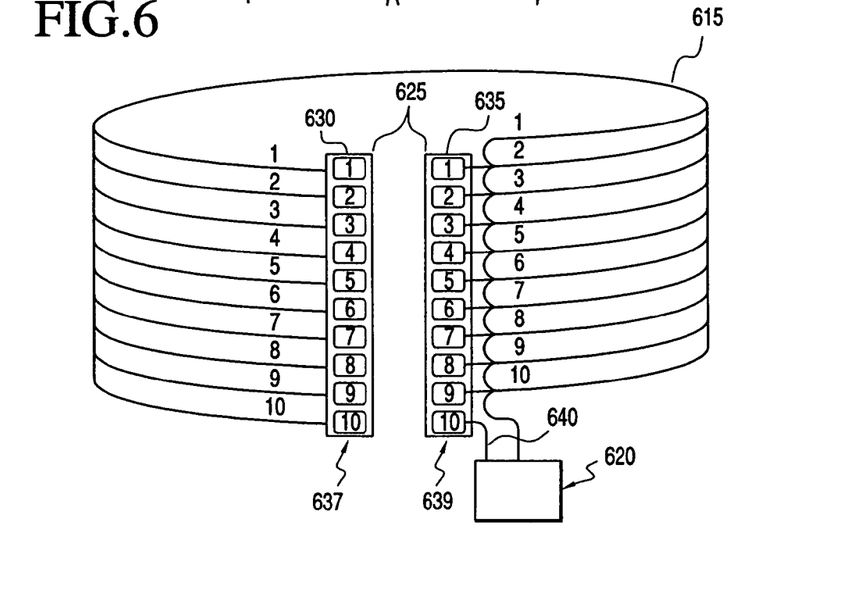
FIG. 6 depicts an exemplary coil according to another embodiment of the invention.

FIG. 6 depicts an exemplary magnetic induction coil 615 adapted to be worn about a body part of an individual and attached to a master hub 620. The exemplary coil 615 is preferably transected and includes a connector 625 disposed at the transaction point. Magnetic induction coil 615 is preferably connected to the master hub 620 to allow data reception and transmission.

Magnetic induction coil 615 is preferably a spirally wound coil positioned around the waist, for example, of an individual. Magnetic induction coil 615 may itself function as a belt to support the waist of the user or it may be employed under or over a standard belt due to its small width and thickness.

Coil 615 is preferably transected at a transaction point, preferably at the belt buckle area, as shown in FIG. 6, or elsewhere. Connector 625 is installed at the transection point to interconnect the coil turns and to permit ease of fastening and unfastening, thereby permitting ease of donning and doffing.

In accordance with an embodiment, connector 625 preferably includes a plug terminal 630 and a receptacle terminal 635. Plug terminal 630 includes a set of plug pins 637 depicted as plug pins $637_1$-$637_{10}$ in FIG. 6. The receptacle terminal 635 includes a set of receptacle pins 639 depicted as receptacle pins $639_1$-$639_{10}$ in FIG. 6. Each of the plug pins 637 corresponds to one of the receptacle pins 639. In at least one embodiment, the number of plug pins 637 and the number of receptacle pins 639 correspond to the number of revolutions of coil 615. For example, in the embodiment of the invention depicted in FIG. 6, coil 615 includes ten turns or revolutions. Thus, as shown in FIG. 6, there are ten plug pins 637 and ten receptacle pins 639.

As illustrated in FIG. 6, each coil revolution includes first and second ends. The first and second ends are preferably connected to connector 625 according to a predetermined pattern that facilitates generation of a strong magnetic field. Where N represents the number of coil revolutions and N≧2, the first end of the Nth revolution ($Rev_N$) is connected to receptacle pin $639_{N-1}$ and the second end of $Rev_N$ is connected to plug pin $637_N$. The first end of the first revolution is connected to master hub 620 and the Nth receptacle pin $639_N$ is directly connected to master hub 620 via lead wire 640. As such, coil 615 serves as the antenna for the transceiver of master hub 620 either alone or in combination with an internal antenna.

Figure 7A:
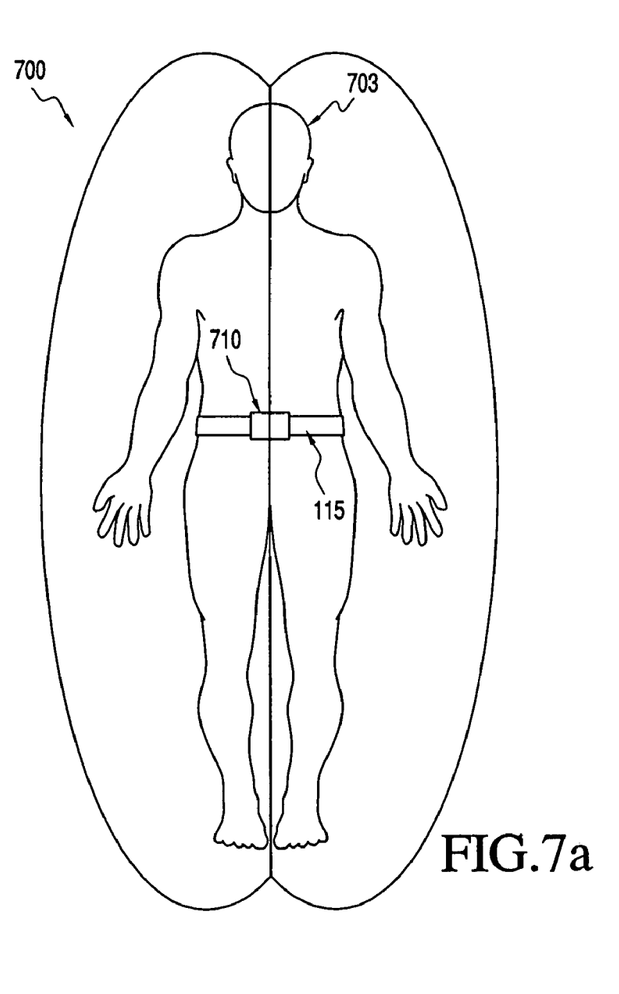
FIGS. 7a and 7b illustrate an embodiment of a magnetic induction transmission network in accordance with the invention.
Figure 7B:
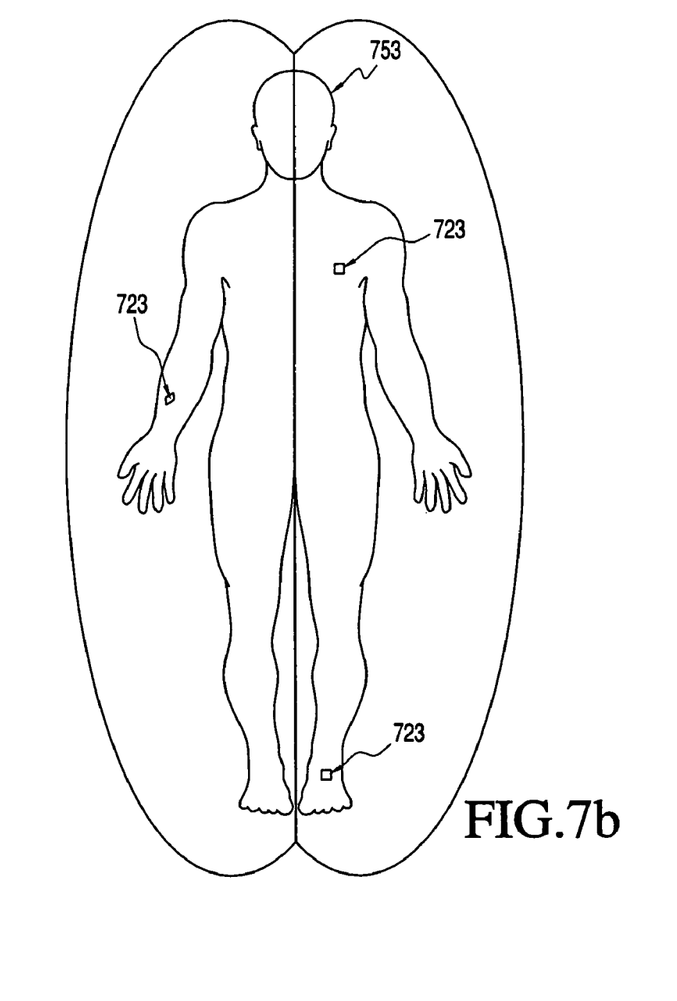

In view of the above description, several practical implementations of network 100 will become apparent to the skilled artisan that fall within the scope of the invention. For example, FIGS. 7a and 7b illustrate a first person 703 with an attached master hub 710 communicating with a second person 753 having at least one sensor node 723 attached. In some embodiments, the first person may be a healthcare worker such as a physician, a physician's assistant, a nurse, a field medic, or a medical technician. The second person may be a hospital patient or a soldier.

In such an implementation, the first person 703 preferably uses magnetic induction network 700 to transmit and/or receive signals to or from the second person 753. In particular, the master hub 710 preferably receives data directly from the at least one sensor node 723 worn by the second person 753.

It should be noted that in the embodiment depicted in FIGS. 7a and 7b, only the first person 703 dons magnetic induction coil 715. For this embodiment, magnetic induction coil 715 is preferably constructed to maximize inter-person communication. The second person 753, for example, does not wear the coil 715. The first person 703 preferably does not wear any sensor nodes 723; it is only desirable to measure parameters of the second person 753. The magnetic field generated by the network 700 is preferably utilized by both the master hub 710 and the at least one sensor node 723 worn by the second person 753 when the first person 703 and the second person 753 are within approximately one to three meters of one another. Thus, the first person 703 may easily monitor parameters associated with the second person. In at least one embodiment, master hub 710 preferably includes additional data storage capability for holding data gathered from a variety of second persons.

Figure 8A:
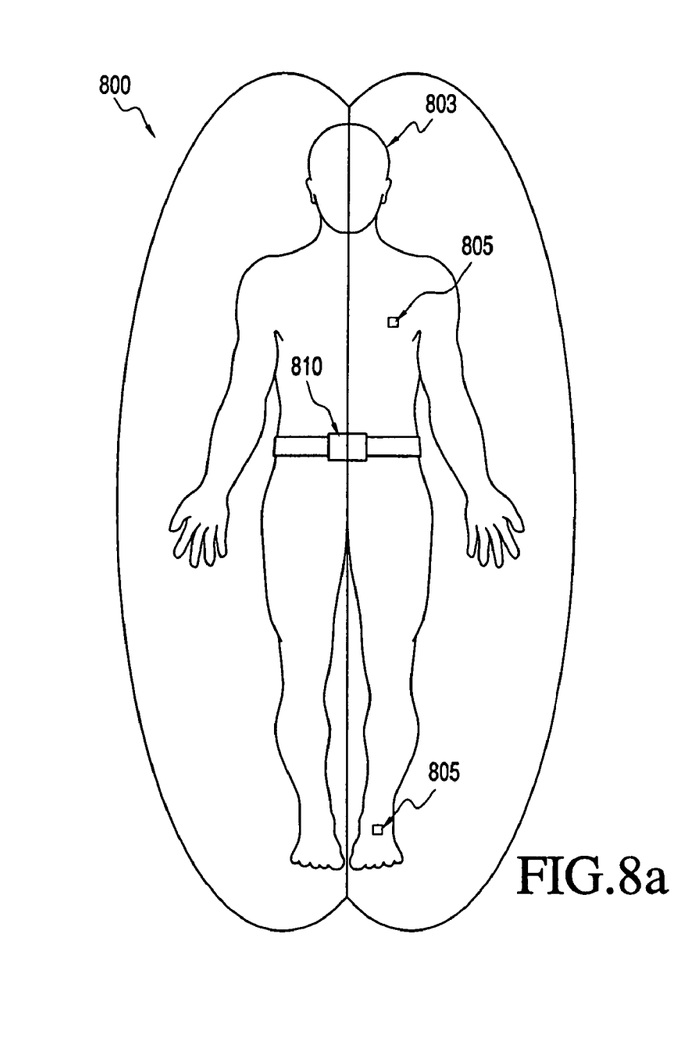
FIGS. 8a and 8b show another embodiment of a magnetic induction transmission network in accordance with the invention.
Figure 8B:
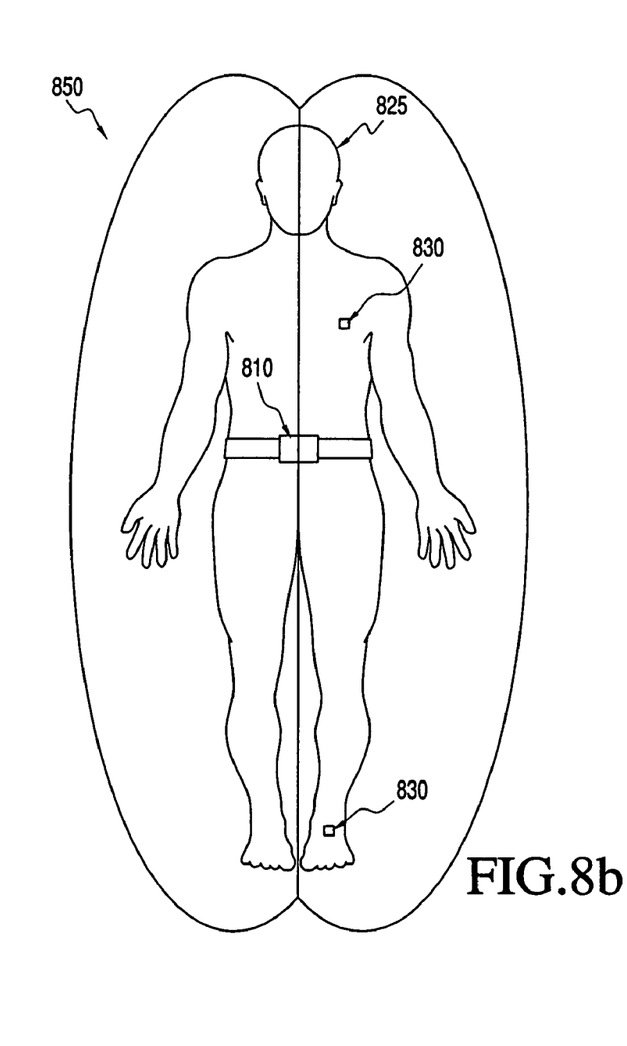

Alternatively, as illustrated in FIGS. 8a and 8b, the first person 803 may be equipped with sensor nodes 805 and master hubs 810 programmed to communicate with senor nodes 805. Likewise, the second person 825 may be equipped with sensor nodes 830 and master hub 810 programmed to communicate with sensor nodes 830. To facilitate exchange of information between the first and the second person, respective master hubs 810 are programmed to communicate with each other.

Figure 9:
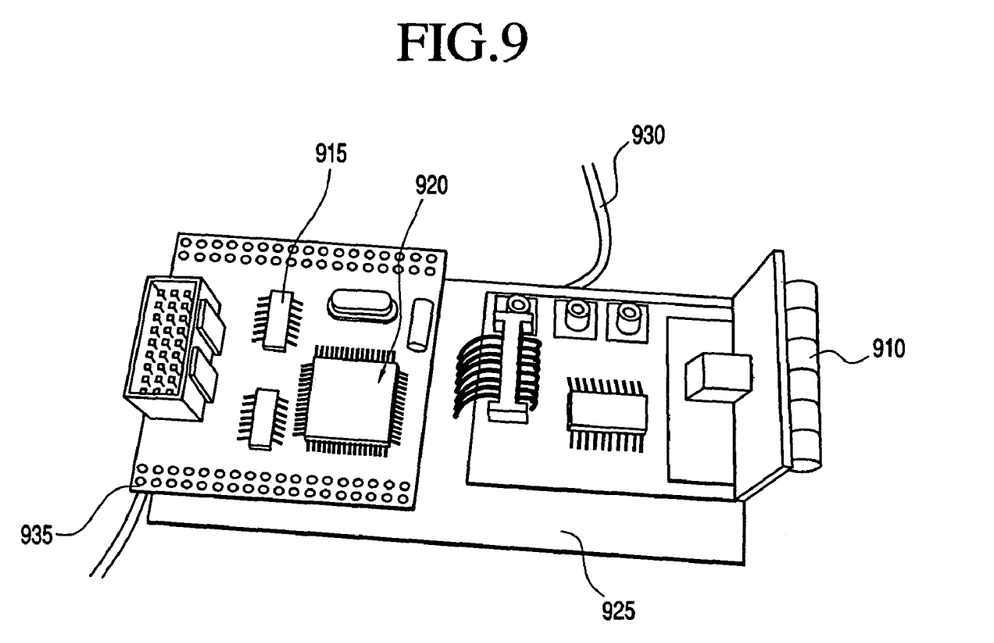
FIG. 9 illustrates an experimental prototype of combination antenna, transceiver and processor.

A trial experiment was conducted to test the data transmission range for a conventional magnetic induction transceiver. The experiment included an Odic bit-error-rate tester setup. Two prototypes were used, one for transmitting and one for receiving. A prototype 900 included an evaluation circuit board 905 including a Xemics XE1209 transceiver by Odic Incorporated, of Westford, Mass., an antenna 910, (also available from Xemics Corporation), and a processor evaluation circuit board 915, as shown in FIG. 9. The processor evaluation circuit board 915 included an Atmel Mega 1128 processor 920. The evaluation boards were attached to a perforation board 925 with wires 930 extruding therefrom for an RS232 connection to a personal computer (PC). Wires 935 lead to a power connection to a three-volt (2×AAA) battery pack (not shown).

Figure 10:
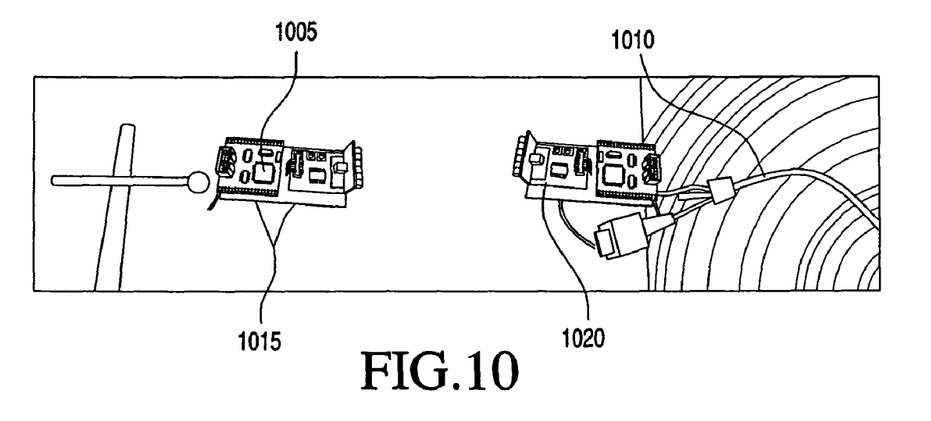
FIG. 10 depicts an experimental prototype receiver module and transceiver module in communication.

The prototypes were mounted on stands 1005 and 1010 on a lab bench in order to allow for accurate measurement of distance and angle, as shown in FIG. 10. Prototype 1015 was configured as a transmitter, and prototype 1020 was configured as a receiver. The prototype 1020 was connected to a PC (not shown) to display bit-error-rate test results real-time.

The bit-error-rate tester (not shown) included firmware with two programs, the transmit side program and the receive side program. The transmit side program sent a repeated sixty-four bit data pattern at a programmable output level. Any power level supported by the Xemics transceiver could be selected. The receive side program looked for the sixty-four bit data pattern and locked onto it. Once locked to the pattern, the receive program compared each received bit with what was expected and registered the bit errors accordingly.

The receive side program ran in two modes. The short term test mode displayed the number of bit errors every 2000 bits (approximiately once a second). This mode was useful when determining how a change to the distance or angle between the transmitter and receiver impacted performance. The long term test mode displayed a cumulative accounting of bits received correctly and in error. This mode was used when performing static tests over many minutes, hours, or days.

Because the coupling between the prototypes 1015 and 1020 is magnetic, orientation had an impact on performance. The bit error rate increased as the antennas (that is, the coils) became more orthogonal to each other.

The working range between the transmitter and receiver depended on the selected output power of the transmitter. The ranges shown in Table 1 below were determined by moving the transmitter and receiver apart until bit errors began to occur, and then moving them closer together until the bit errors ceased to occur.

TABLE 1

Relationship between transmit power and distance

| Transmit power | Distance at best orientation (parallel) | Distance at worst orientation (perpendicular) |
|---|---|---|
| 110 mA | 44 inches | 14 inches |
| 60 mA | 37 inches | 13 inches |
| 30 mA | 29 inches | 9 inches |
| 7.5 mA | 18 inches | 7.5 inches |
| 3.5 mA | 1.25 inches | 0.75 inches |
| 1.8 mA | 0.25 inches | 0 |

In order to obtain an estimation for the baseline bit error rate (BER) at different distances and power levels, a series of two-hour static tests (that is, non-moving transmitter and receiver) were run at seventy-five percent and twenty-five percent of the maximum distance, as shown in Table 2 below. Approximately 14E6 bits were transmitted in two hours, providing a fairly accurate test for baseline performance.

TABLE 2

Relationship between baseline bit error rate (BER) and distance

| Transmit Power (mA) | Maximum Range (inches) | BER @ 75% of range | BER @ 25% of range |
|---|---|---|---|
| 7.5 | 14 | 0.0e−0 (10.5 in) | 0.0e−0 (3.5 in) |
| 30 | 26 | 8.0e−8 (19.5 in) | 0.0e−0 (6.5 in) |
| 60 | 34 | 8.0e−8 (25.5 in) | 0.0e−0 (8.5 in) |
| 110 | 44 | 4.2e−1 (33.0 in) | 0.0e−0 (11.0 in) |

When the transmitter was operated at the maximum power of 110 mA, at seventy-five percent of the full range, a substantial amount of bit errors were noticed. The bit errors were typically sporadic but in large groups.

Two separate tests were performed to test bit error rates when the transmitter and receivers were moving with respect to each other. Both the transmitter and receiver were operating at seventy-five percent of their maximum range. The first test investigated angular changes. When holding one end still and rotating the other end along three axes (yaw, pitch and roll), no significant bit errors occurred as long as rotation was less than +/−45 percent of the perfectly aligned orientation. The second test investigated changes in distance. The test was performed by maintaining the angular orientation fixed as the units were moved closer and farther apart at various rates. If the distance moved exceeded twenty percent of the maximum range, bit error were produced.

When at maximum power and distance (that is, 110 mA and 44 inches, respectively), standing between the units had no impact on the range (no bit errors were introduced). The signal was essentially going through or around an adult male chest. When at 7.5 mA and a distance of eighteen inches, that maximum distance for that power, pressing the transmit and receive units against an adult male chest and waist had no impact on the range, i.e. no bit errors were introduced.

The transmitter and receiver were also attached to different human bodies about eighteen inches apart and pressed against a large metal object such as a trash dumpster. No bit errors were introduced.

A measurement of current draw was also performed at the various transmit power levels. The results of the measurements are shown in Table 3. It should be noted that power draw was 200 uA in the receive mode.

TABLE 3

Relationship between board supply current and Transmit Power

| Transmit Power (mA) | Board Supply Current (mA) |
|---|---|
| 7.5 | 6.6 |
| 60 | 35 |
| 110 | 70 |
| <standby> | 2 uA |

Those skilled in the art will appreciate that various adaptations and modifications of the above-described embodiments of the present invention can be configured without departing from the scope and spirit of the present invention. For example, magnetic induction coils of the present invention need not be located around an individual's waist. For example, in at least one embodiment of the invention, the magnetic induction coils 515 and 615 are preferably armbands, leg bands, shoulder bands, or neckbands. In addition, magnetic induction coils 515, 615 may be separate accessories or may be attached to or integrated with a garment.

In view of the foregoing, it is to be understood that, within the scope of the appended claims, the invention may be practiced and constructed other than as specifically described herein.

We claim:

1. A personal area network for transmitting and receiving data via magnetic induction, comprising:
   a magnetic induction antenna belt;
   a primary transceiver for inclusion in a belt buckle attached to said belt;
   an adapter for inclusion in said belt buckle, said adapter for electronically coupling said primary transceiver to said magnetic induction antenna belt and
   a plurality of secondary transceivers in communication with said primary transceiver to allow said primary transceiver to communicate with said plurality of secondary transceivers via said antenna belt, said plurality of secondary transceivers being located in proximity to said primary transceiver, and at least one of said secondary transceivers being coupled to a physiological sensor attached to a body part.

2. The personal area network of claim 1, wherein said magnetic induction antenna belt has a magnetic induction coil that conducts a current in the milliampere range.

3. The personal area network of claim 1, wherein data transmission and reception between said primary and secondary transceivers occurs over a maximum distance range of two to three meters.

4. The personal area network of claim 1, wherein said primary transceiver is the master hub and includes a magnetic induction transceiver.

5. The personal area network of claim 1, wherein said primary transceiver is magnetically coupled to at least one sensor node.

6. The personal area network of claim 1, wherein said at least one sensor node and said magnetic induction coil are misaligned by an angle of plus or minus forty-five degrees.

7. The personal area network of claim 1, wherein said coilbelt includes at least one wire forming at least one revolution around an individual's waist.

8. The personal area network of claim 7, wherein said at least one wire is manufactured of ribbon cable.

9. The personal area network of claim 7, wherein said at least one wire is manufactured of Mylar cable.

10. The personal area network of claim 1 wherein said at least one sensor node includes a physiological sensor.

11. The personal area network of claim 1, wherein at least one secondary transceiver is coupled to a sensor node.

12. The personal area network of claim 11, further comprising a connector residing at a transaction point of said magnetic induction coil, said connector serving as an intermediary between said coil and said hub.

13. The personal area network of claim 12, wherein said connector includes
   a plug terminal including a set of plug pins; and
   a receptacle terminal including a set of receptacle pins;
   wherein each of said plug pins corresponds to a receptacle pin.

14. The personal area network of claim 13, wherein at least one wire is connected to one of said plug pins and said master hub and at least one wire is connected to one of said receptacle pins and said master hub.

15. The personal area network of claim 14, wherein at least one wire is connected to one of said receptacle pins and one of said plug pins.

16. The personal area network of claim 14, wherein at least one wire is connected to one of said receptacle pins and one of said plug pins, said one of said plug pins being offset from said one of said receptacle pins by one greater position.

17. The personal area network of claim 14, wherein at least one wire is connected to one of said receptacle pins and one of said plug pins, said one of said receptacle pins being offset from said one of said plug pins by one greater position.

18. The personal area network of claim 1, wherein said belt buckle is a part of said hub and allows fastening and unfastening of said magnetic induction coilbelt.

* * * * *